(Model.)

A. R. SCHMIDT.
CARRIAGE SPRING.

No. 323,535. Patented Aug. 4, 1885.

Witnesses.
J. E. Robison
J. M. Kernan

Inventor.
Andrew R. Schmidt
per
J. B. Davis,
Attorney.

N. PETERS. Photo-Lithographer. Washington, D. C.

UNITED STATES PATENT OFFICE.

ANDREW R. SCHMIDT, OF ANN ARBOR, MICHIGAN.

CARRIAGE-SPRING.

SPECIFICATION forming part of Letters Patent No. 323,535, dated August 4, 1885.

Application filed June 2, 1884. (Model.)

*To all whom it may concern:*

Be it known that I, ANDREW R. SCHMIDT, a citizen of the United States, residing at Ann Arbor, in the county of Washtenaw and State of Michigan, have invented a new and useful Carriage-Gear, of which the following is a specification.

My invention relates to carriage-gears in which side springs are used; and the objects of my invention are, first, to provide for taking up the thrust of the side springs without the use of side reaches, C ends to the springs, flexible spring-bars, or any of the usual devices; second, to reduce the number of parts in side-spring gears; third, to retain the old central braced reach; fourth, to provide for bracing the frame-work of the gear as fully as may be needed for any service whatever; and, fifth, by reducing the number of parts and simplifying the construction to reduce cost, and to provide a gear not requiring skilled smiths in constructing the same. I attain these objects by the mechanism illustrated in the accompanying drawings, in which—

Figure 1:
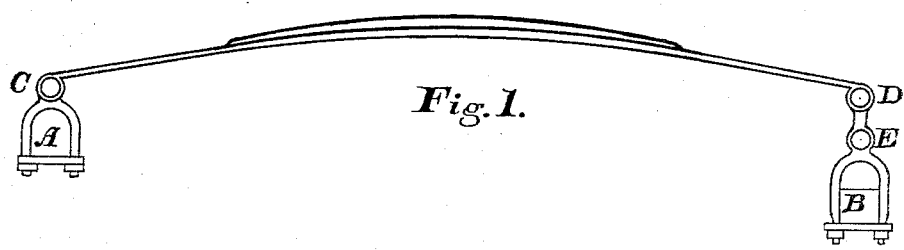
Figure 2:
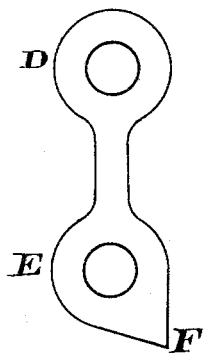

Figure 1 is a side view of a spring and its end connections, and Fig. 2 is a view of the link used in one of these end connections.

Similar letters refer to similar parts in both figures.

A is the head-block at the forward end of the gear, B the rear axle, and C D the spring. At C is an ordinary bolt and clip connection, as shown. At D I use a link, D E, between the end of the spring C D and the axle-clip to form the connection. The axle B and the head-block A being rigidly connected by a reach, the thrust of the spring C D is taken by the rocking motion of the link D E. The link D E has a projection, F, Fig. 2, formed on it, which prevents the upward motion of the spring C D from turning the link D E beyond what may be desired in the direction opposite the thrust of the spring C D.

The two side springs are connected at the top by suitable cross-pieces, and the box then mounted on them.

By the introduction of the link D E, as shown and described, I am enabled to retain a braced reach of the most rigid form between the head-block A and the axle B. This reach may be braced at both ends, and a very rigid connection between A and B thereby secured.

The link D E may be placed at either end of the spring C D.

The arrangement of parts described acts as an equalizer between the two springs.

I am aware that prior to my invention links have been used in the end connections of springs, but always below the point of support, and I do not, therefore, claim the link broadly; but What I do claim as my invention, and desire to secure by Letters Patent, is—

The link D E, with its projection F, as a new form of link and a new article of manufacture.

Ann Arbor, Michigan, April 28, 1884.

ANDREW R. SCHMIDT.

Witnesses:
 J. E. ROBISON,
 A. MCKERNAN.